United States Patent
Mahimkar et al.

(10) Patent No.: US 12,052,136 B2
(45) Date of Patent: *Jul. 30, 2024

(54) CONFLICT-FREE CHANGE DEPLOYMENT

(71) Applicants: AT&T Intellectual Property I, L.P., Atlanta, GA (US); AT&T Mobility II LLC, Atlanta, GA (US)

(72) Inventors: Ajay Mahimkar, Edison, NJ (US); Rakesh Sinha, Edison, NJ (US); Carlos Eduardo De Andrade, Gainesville, FL (US); Weiyi Zhang, Edison, NJ (US); Robert Riding, Bothell, WA (US)

(73) Assignees: AT&T Intellectual Property I, L.P., Atlanta, GA (US); AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/900,061

(22) Filed: Aug. 31, 2022

(65) Prior Publication Data

US 2022/0417092 A1    Dec. 29, 2022

Related U.S. Application Data

(63) Continuation of application No. 17/157,558, filed on Jan. 25, 2021, now Pat. No. 11,463,307, which is a
(Continued)

(51) Int. Cl.
*H04L 41/0813* (2022.01)
*H04L 41/08* (2022.01)
(Continued)

(52) U.S. Cl.
CPC ...... *H04L 41/0813* (2013.01); *H04L 41/0836* (2013.01); *H04L 41/085* (2013.01);
(Continued)

(58) Field of Classification Search
CPC ............ H04L 41/0813; H04L 41/0836; H04L 41/085; H04L 41/0873; H04L 41/0883;
(Continued)

(56) References Cited

U.S. PATENT DOCUMENTS 5,504,921 A    4/1996   Dev et al.
6,701,358 B1   3/2004   Poisson et al.
(Continued)

FOREIGN PATENT DOCUMENTS

EP        3026849 A1        6/2016
WO     WO2016/032467      3/2016
(Continued)

OTHER PUBLICATIONS

"Cloudband With Openstack as NFV Platform—Strategic White Paper / NFV Insight Series", Article; Alcatel-Lucent, 2014, 11 pages.
(Continued)

*Primary Examiner* — Ramy M Osman
(74) *Attorney, Agent, or Firm* — Guntin & Gust, PLC; Mark Wilinski

(57) ABSTRACT

A new scalable approach to conflict-free deployment of changes across networks. The conflict rules or constraints may be modeled using policies and algorithms to determine an optimized schedule for change deployment.

20 Claims, 7 Drawing Sheets

Related U.S. Application Data continuation of application No. 16/277,347, filed on Feb. 15, 2019, now Pat. No. 10,958,517.

(51) Int. Cl.
| | | |
|---|---|---|
| *H04L 41/0823* | (2022.01) | |
| *H04L 41/085* | (2022.01) | |
| *H04L 41/0873* | (2022.01) | |
| *H04L 41/12* | (2022.01) | |
| *H04N 21/462* | (2011.01) | |

(52) U.S. Cl.
CPC ...... *H04L 41/0873* (2013.01); *H04L 41/0883* (2013.01); *H04L 41/0889* (2013.01); *H04L 41/12* (2013.01); *H04N 21/4622* (2013.01)

(58) Field of Classification Search
CPC . H04L 41/0889; H04L 41/12; H04N 21/4622; H04N 21/26208; H04N 21/26291
See application file for complete search history.

(56) References Cited

U.S. PATENT DOCUMENTS

| | | | |
|---|---|---|---|
| 7,093,005 | B2 | 8/2006 | Patterson |
| 7,363,623 | B2 | 4/2008 | Kishida |
| 7,385,938 | B1 | 6/2008 | Beckett et al. |
| 7,831,689 | B2 | 11/2010 | Poisson et al. |
| 7,881,745 | B1 | 2/2011 | Rao et al. |
| 7,886,046 | B1* | 2/2011 | Zeitoun ............... H04L 41/145 706/56 |
| 8,185,891 | B2 | 5/2012 | Dehaan |
| 8,346,897 | B2 | 1/2013 | Jaroker |
| 8,458,695 | B2 | 6/2013 | Fitzgerald et al. |
| 8,572,587 | B2 | 10/2013 | Dehaan et al. |
| 8,578,008 | B1 | 11/2013 | Sella et al. |
| 8,732,693 | B2 | 5/2014 | Mutisya et al. |
| 8,838,120 | B2 | 9/2014 | Örjmark et al. |
| 8,943,489 | B1 | 1/2015 | Qu |
| 8,996,044 | B2 | 3/2015 | Xing et al. |
| 9,038,055 | B2 | 5/2015 | Mutisya et al. |
| 9,141,381 | B2 | 9/2015 | Siddegowda |
| 9,164,749 | B2 | 10/2015 | Dehaan |
| 9,172,606 | B2 | 10/2015 | Rezvani et al. |
| 9,208,007 | B2 | 12/2015 | Harper et al. |
| 9,218,195 | B2 | 12/2015 | Anderson et al. |
| 9,229,774 | B1 | 1/2016 | Wilkes et al. |
| 9,294,942 | B2 | 3/2016 | Salonidis et al. |
| 9,794,160 | B1 | 10/2017 | Felstaine et al. |
| 9,985,843 | B2 | 5/2018 | Gupta et al. |
| 10,064,167 | B1 | 8/2018 | Felstaine et al. |
| 10,069,694 | B1 | 9/2018 | Schwartz et al. |
| 10,116,514 | B1 | 10/2018 | Felstaine et al. |
| 10,374,888 | B2 | 8/2019 | Mahimkar et al. |
| 10,572,237 | B2 | 2/2020 | Mahimkar et al. |
| 10,841,791 | B1 | 11/2020 | Zhang et al. |
| 10,958,517 | B2 | 3/2021 | Mahimkar et al. |
| 11,463,307 | B2* | 10/2022 | Mahimkar ........... H04L 41/0873 |
| 2005/0229171 | A1 | 10/2005 | Henry et al. |
| 2006/0080656 | A1 | 4/2006 | Cain et al. |
| 2006/0184937 | A1 | 8/2006 | Abels et al. |
| 2007/0266368 | A1 | 11/2007 | Szpak et al. |
| 2009/0037926 | A1 | 2/2009 | Dinda et al. |
| 2009/0222540 | A1* | 9/2009 | Mishra .................. H04L 41/147 707/999.107 |
| 2009/0316600 | A1 | 12/2009 | Yumoto et al. |
| 2010/0002582 | A1 | 1/2010 | Luft et al. |
| 2011/0239011 | A1 | 9/2011 | Waris et al. |
| 2011/0298598 | A1* | 12/2011 | Rhee ....................... H04W 4/38 340/286.02 |
| 2012/0173688 | A1* | 7/2012 | True ....................... G06F 9/4843 709/223 |
| 2012/0218917 | A1* | 8/2012 | Komarevtsen ...... H04L 41/0843 370/254 |
| 2013/0060360 | A1* | 3/2013 | Yamamoto .......... H04L 12/2818 700/90 |
| 2013/0290520 | A1* | 10/2013 | Noo ........................ H04L 43/04 709/224 |
| 2014/0095734 | A1 | 4/2014 | Chan et al. |
| 2014/0229928 | A1 | 8/2014 | Edström et al. |
| 2014/0229945 | A1 | 8/2014 | Barkai et al. |
| 2014/0310707 | A1 | 10/2014 | Rajan et al. |
| 2015/0082308 | A1 | 3/2015 | Kiess et al. |
| 2015/0149627 | A1 | 5/2015 | Zhao et al. |
| 2015/0180730 | A1 | 6/2015 | Felstaine et al. |
| 2015/0296258 | A1 | 10/2015 | Morten |
| 2015/0327153 | A1 | 11/2015 | Tervonen et al. |
| 2016/0043944 | A1 | 2/2016 | Felstaine et al. |
| 2016/0085641 | A1 | 3/2016 | Nagasubramaniam et al. |
| 2016/0218948 | A1 | 7/2016 | Djukic |
| 2016/0234082 | A1 | 8/2016 | Xia et al. |
| 2016/0239330 | A1 | 8/2016 | McBride et al. |
| 2016/0360439 | A1* | 12/2016 | Phan ....................... H04L 43/08 |
| 2016/0371063 | A1 | 12/2016 | Chiosi et al. |
| 2016/0380807 | A1* | 12/2016 | Shevenell ............ H04L 41/082 370/254 |
| 2016/0380839 | A1 | 12/2016 | Gupta et al. |
| 2017/0034558 | A1 | 2/2017 | Pottier |
| 2017/0055276 | A1 | 2/2017 | Callard et al. |
| 2017/0228415 | A1* | 8/2017 | Cadarette ............ H04L 67/1095 |
| 2018/0121426 | A1* | 5/2018 | Barsness .............. G06F 9/5011 |
| 2018/0124867 | A1 | 5/2018 | Tsvetkov et al. |
| 2018/0165084 | A1 | 6/2018 | Mahimkar et al. |
| 2018/0167277 | A1 | 6/2018 | Mahimkar et al. |
| 2018/0248750 | A1 | 8/2018 | Johnston et al. |
| 2018/0357058 | A1 | 12/2018 | Malaspina et al. |
| 2019/0215240 | A1* | 7/2019 | Li ......................... H04L 41/0826 |
| 2019/0243634 | A1 | 8/2019 | Lewis |
| 2019/0260690 | A1 | 8/2019 | Sun et al. |
| 2019/0306023 | A1* | 10/2019 | Vasseur ............... H04L 41/0816 |
| 2019/0372844 | A1 | 12/2019 | Moats et al. |
| 2020/0267052 | A1 | 8/2020 | Mahimkar et al. |
| 2020/0296004 | A1* | 9/2020 | Gonguet ................. H04L 41/22 |
| 2021/0157484 | A1* | 5/2021 | Viraraghavan ....... G06F 3/0685 |
| 2021/0250232 | A1 | 8/2021 | Mahimkar et al. |
| 2022/0321408 | A1* | 10/2022 | Mahimkar .......... H04L 41/0627 |
| 2022/0417092 | A1* | 12/2022 | Mahimkar ............ H04L 41/085 |

FOREIGN PATENT DOCUMENTS

| | | |
|---|---|---|
| WO | WO2016/078417 | 5/2016 |
| WO | WO2016/128606 | 8/2016 |
| WO | WO2016/155291 | 10/2016 |

OTHER PUBLICATIONS

"ECOMP (Enhanced Control, Orchestration, Management & Policy) Architecture White Paper", Article; AT&T Inc., 2016, 31 pages.

Liang, Ben et al., "Virtual Backbone Generation and Maintenance in Ad Hoc Network Mobility Management", IEEE INFOCOM, 2000, 10 pages.

Mahimkar, et al., "Rigorous, Effortless and Timely Assessment of Cellular Network Changes", 49th Annual IEEE/IFIP Int'l Conf. on Dependable Systems and Networks, 2019.

* cited by examiner

CONFLICT-FREE CHANGE DEPLOYMENT

CROSS REFERENCE TO RELATED APPLICATIONS

This application is a continuation of, and claims priority to, U.S. patent application Ser. No. 17/157,558 filed Jan. 25, 2021, which is a continuation of, and claims priority to, U.S. patent application Ser. No. 16/277,347 filed Feb. 15, 2019, now U.S. Pat. No. 10,958,517, all sections of the aforementioned application(s) and/or patent(s) are incorporated herein by reference in their entirety.

BACKGROUND

Network change activities play a role in service and network management. Changes can be in the form of software, hardware, or firmware upgrades. Changes may inadvertently impact service and network performance based on operations that resolve conflicts through manual coordination.

SUMMARY

A new scalable approach to conflict-free deployment of changes across 5G/LTE/cloud networks (herein also referred to as network change management). Herein the conflict rules or constraints may be modeled using policies and algorithms to effectively determine the optimized schedule for change deployment.

In an example, an apparatus may include a processor and a memory coupled with the processor that effectuates operations. The operations may include obtaining a request for a network change for a network function in a network. The request may include a possible date range for the network change, start date for the network change, an end date for the network change, or estimated time for the network change execution. In addition, the operations may further include obtaining information associated with a network change of a plurality of network devices; based on the request for the network change for the network function and the information associated with the network change of the plurality of network devices in the network, determining a schedule for implementing the network change of the network function that does not conflict with the network change of the plurality of network devices; and sending a message to a device, wherein the message comprises the schedule for implementing the network change of the network function. Note that disclosed server may find a schedule within that data range for each of the changes. The network function may be virtual or physical.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Conventionally schedules may be manually identified and created. Conflicts to the schedule may be manually coordinated with other groups and manually rescheduled in order to allow for a network device change or new network device deployment. Disclosed herein is a scalable approach to conflict-free change deployment in virtualized networks or physical networks.

Network change activities play a role in service and network management. Changes can be in the form of software, hardware, or firmware upgrades, configuration changes, new service feature roll-outs, introduction, removal or re-homing of network equipment, and technology updates. Changes may be carefully introduced into a network so that the changes do not inadvertently impact service and network performance. In addition, change activities with overlapping impact scopes may have a higher risk of performance impacts and may also make troubleshooting difficult in the event of unexpected service quality degradations. For example, approximately simultaneous changes at eNodeB (LTE base stations) and MSN (transport switch) in the cellular networks that are on the end-to-end service path may make root-cause detection and troubleshooting difficult if there is degradation in service quality experienced by end-users. In certain scenarios, the change activities cannot be carried out concurrently because of availability of resources. Thus, it may be important to carefully schedule maintenance activities and avoid any overlapping conflicts.

Conflicts can arise due to several factors such as activities across different work groups (for example, operations teams responsible for deploying software upgrades or operations teams responsible for configuration changes on the network elements), across layers, or across end-to-end service paths. A manual coordination process may be extremely time-consuming, laborious, and error-prone. Disclosed herein is an approach for scheduling changes based on conflict avoidance. By apriori capturing the constraints for conflict avoidance, the dependencies may be modeled across changes and new optimization solutions may be devised to effectively determine the schedule to deploy the changes.

Figure 1:
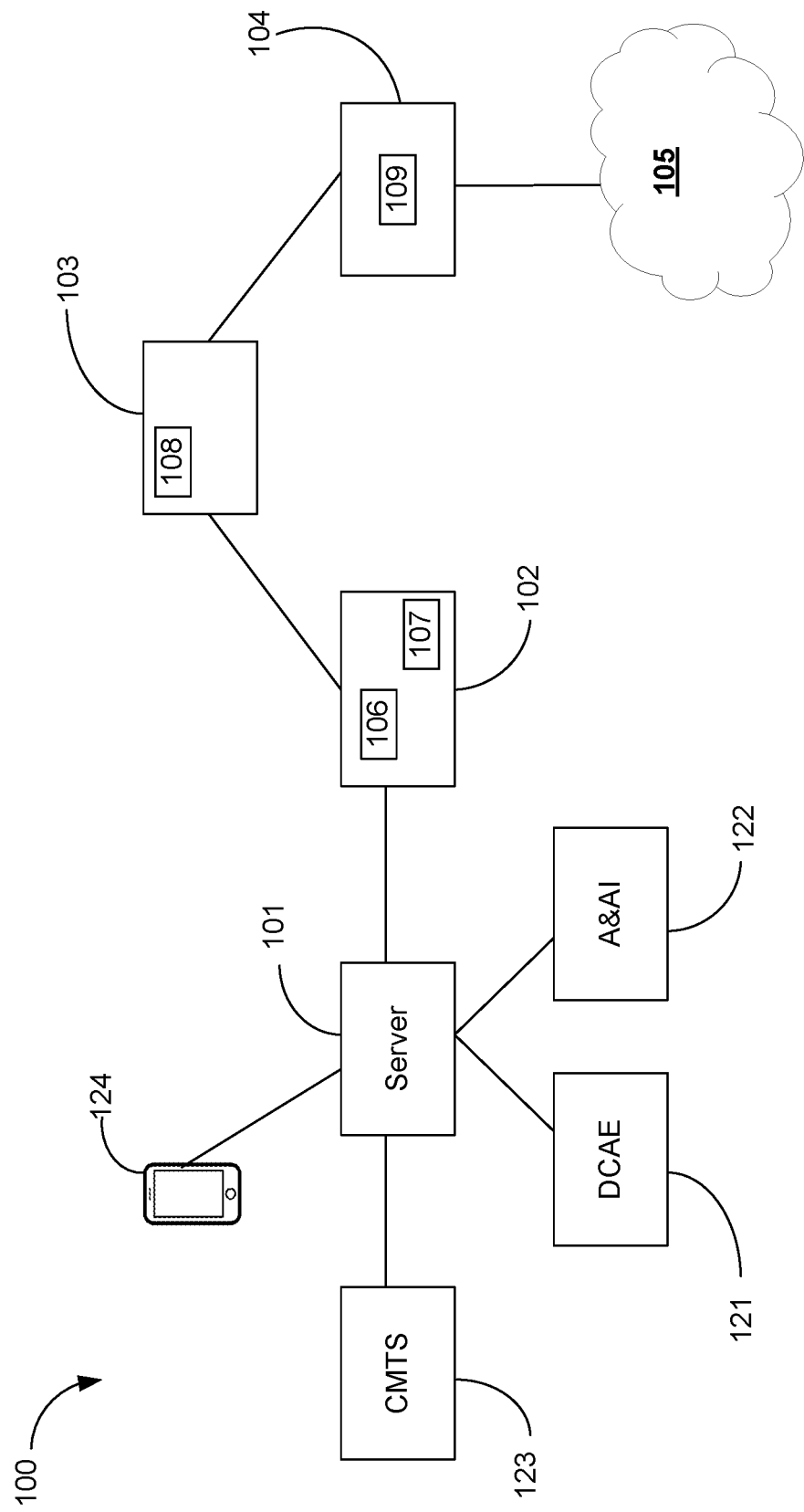
FIG. 1 illustrates an exemplary system that may implement network change deployment.

FIG. 1 illustrates an exemplary system that may implement network change deployment for software or hardware, for example, as disclosed herein. System 100 includes network device 101, network device 102, network device 103, and network device 104 that may be communicatively connected to each other and network 105. The aforementioned network devices may include virtual network functions (VNFs), such as VNF 106, VNF 107, VNF 108, or VNF 109, which may be distributed or centrally located on one or more network devices. Each device in system 100 may be communicatively connected with each other. Network device 101 may be used to obtain messages associated with scheduled network changes for hardware (e.g. power down of network device 103) or software (e.g., software update VNF 108).

In an example, with reference to FIG. 1, VNF 108 may be experiencing significant errors that degrade performance and the service provider may determine that the VNF 108 may need to be reconfigured in order to stop the errors. This reconfiguration of VNF 108 may need to occur during period t1 (e.g., 2 AM-2:30 AM local time) in order to not cause an issue with other functions in the network (e.g., VNF 106 and VNF 107). The VNFs in system 100 may be maintained by different operational groups of the service provider and, for this example, any maintenance of a first VNF (e.g., VNF 106) and a second VNF (e.g., VNF 109), during the same time, may significantly affect the performance of the service provider network. The change system as disclosed herein may help avoid such issues.

Figure 2:
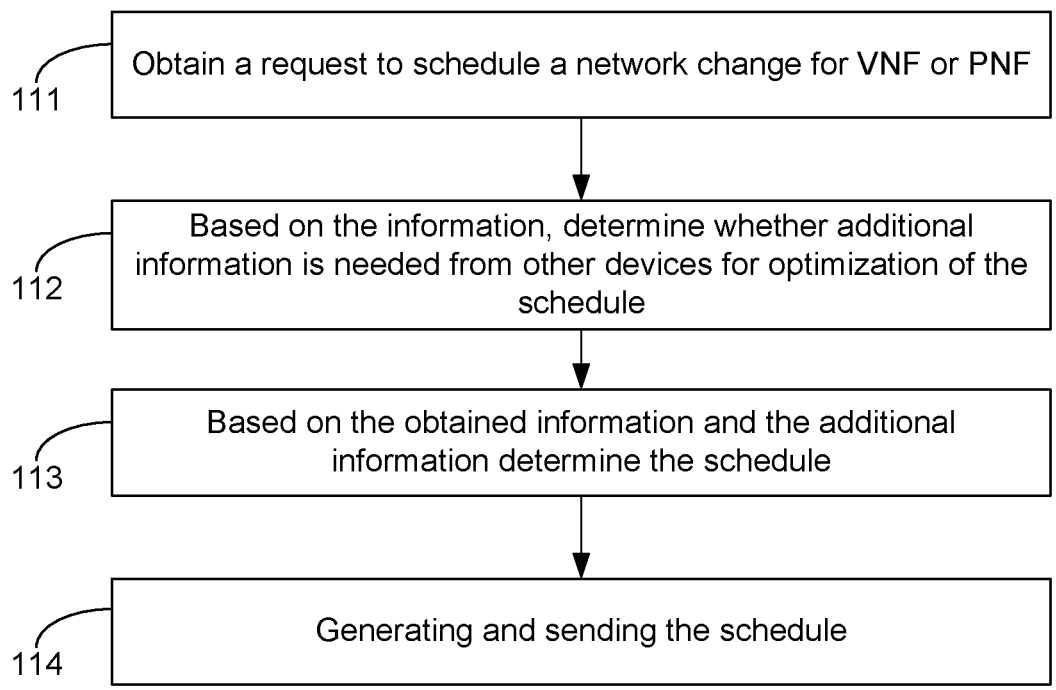
FIG. 2 illustrates an exemplary method for network change deployment for software or hardware, as disclosed herein.

FIG. 2 illustrates an exemplary method for network change deployment for software or hardware, as disclosed herein. At step 111, network device 101 (e.g., a server) may obtain a request to schedule a network change for a virtual network function (VNF) or physical network function (PNF). The request of step 111 may include information, such as start date of network change, end date of network change, estimated time of network change execution, policies for conflict avoidance, or list of VNF instances to be scheduled, among other things. Policies for conflict avoidance include constraints for determining the change schedule to be deployed across the network and may include preference for a specific time of day (e.g., maintenance window), vertical topology conflict, or capacity constraint (e.g., concurrent executions). Vertical topology conflict may be associated with avoiding conflicting work: 1) on the same instance requested by other operation groups of the service provider; 2) with physical servers hosting the VNF instance; or 3) other instances in the same cloud network zone, among other things. In an example associated with vertical topology and FIG. 1, if a first operational group needs to work on network device 103 (e.g., take down the physical device) and a second operational group needs to work on VNF 108 (e.g., configure the software of VNF 108), then there may be a vertical topology conflict in the network change management schedule.

With continued reference to step 111, the policies for conflict avoidance may be obtained from the request or may already be predetermined (e.g., preloaded based on previous determinations or entries). The policies may take into account the change (e.g., type of change to software or hardware), the time-slot, or the loader (e.g., an individual executing or supervising the changes), among other things. Table 1 provides additional policy examples which may overlap and be used at the same time.

TABLE 1

| Policy (e.g., constraints) | Description |
|---|---|
| Order | An example may include completing an activity (e.g., network change) within geographical proximity (e.g., a city or groups of cities), also referred to herein as a market, before starting the next market, in which the order of completing all markets is not specified. In another example, the order of the completing all markets or equipment types may be specified. Such as completing hardware version 1 before hardware version 2. |

TABLE 1-continued

| Policy (e.g., constraints) | Description |
|---|---|
| Capacity constraints per group | An example may include a constraint of number X (e.g., 3000) of base stations for software upgrades done concurrently (e.g., approximately the same time), but constraint of number Y (e.g., 15,000) of bases stations for configuration change done concurrently. |
| Loader Constraints | In an example, loader may only want to do work during a certain period associated with Loader's time zone (e.g., 1AM-3AM Pacific rather than 1AM-3 AM eastern). Similarly they may want some uniformity on the work assigned to them, e.g., on any given night, all configuration changes done by a loader should be for (different instances of) the same element type Note that time zone constraints may also apply to network devices as well as Loader. |
| Group Constraints | In an example, eNodeBs from the same location (e.g., same USID) should be changed (e.g., upgraded) during the same day and time period, which may avoid software inconsistency. In other words a group constraint may be a constraint for a plurality of devices of a certain type, location in the network, or pattern of usage (e.g., bandwidth usage, processor usage, or sleep mode), among other things. This group constraint may be for incorporating groups of network elements to be upgraded or otherwise changed at approximately the same period. |
| Preferential Selection | In an example, nodes that have higher service level agreement (SLA) requirements should be upgraded (or otherwise changed) before nodes with lower SLA requirements. Another example is that a hardware board need to be switched before we can upgrade the software. |
| Special Events | In an example, if a large sports event is happening in a region (e.g., a city, a number of square miles around a geographical location, or the overlapping locations that are served by the same devices), then no changes may be scheduled to be made. Other examples are expected vacation of loaders, expected weather issues (e.g., hurricane). The special event may be a constraint that provides limits based on the occurrence of the event during or approximate to certain times. |
| Service Path Constraints | A service path captures the network elements traversed by traffic in the forward and reverse direction. For example, when users connect to LTE network, they first connect to the LTE eNodeB. From eNodeB the traffic traverse through a collection of switches, routers, MME (Mobility Management Entities), or gateways, among other things. Sometimes a change should be done together (approximately the same time) or at different times (e.g., information associated with changes to a PNF/VNF should propagate over hours or days before doing changes to another PNF/VNF). |
| Survivability constraints | In addition to capacity constraints, there may be more granular requirements on what changes can be scheduled together. For example, if there are 5 servers providing a function, then no more than 2 may be upgraded at any given time. This constraint may be in the form of a percentage (e.g., more than 60% of the devices available to provide that function in a particular market must be working or not scheduled for maintenance) or number of devices, which may physical or virtual. |

At step 112, based on the information of step 111, additional information may be obtained for schedule optimization. Information may be requested from Data Collection and Analytics Engine (DCAE) 121, Active and Available Inventory (A&AI) 122, or Change Management Ticketing System (CMTS) 123, among other things. The information from DCAE 121 may include traffic and utilization data that is important to capture busy versus non-busy times. The information from A&AI 122 may include topology and inventory data that is important to capture relationships across network elements and the configuration settings on the network elements. The information from CMTS 123 may include planned start/end timestamps for the change activity, list of network elements, summary/description of the change activity, status of execution, requestor/executor information, risk assessment of the change, and other attributes associated to the change.

At step 113, based on the obtained information of step 111 and step 112, network device 101 may determine whether a requested time frame of step 111 is available, whether there are additional time frames within the same week, month, or year that would not conflict, if there is a conflict that can be resolved based on authorization without change of the schedule, or if there is a conflict that can be resolved based on a slight change of the schedule. For example, a conflict that can be resolved based on a slight change may be the order of the change. Therefore, there may be no conflict if VNF 108 is completed 15 minutes before already scheduled change to network device 103. There may just need to be a delay to the start of network device 103's scheduled change for 15 minutes (e.g., 2 AM to 2:15 AM) and a change to the requested VNF 108 change to 2 AM rather than 2:30 AM as requested.

At step 114, a message may be sent. The message may be sent to a change management portal (e.g., display of mobile device 124), sent to another user to request authorization or altered schedule (see step 113 examples), or sent to CMTS 123. The message may be sent to CMTS 123 in order for CMTS 123 to implement an automatic change (e.g., push of commands or configurations to network device 103 or VNF 108) for the scheduled time, among other things.

Figure 3:
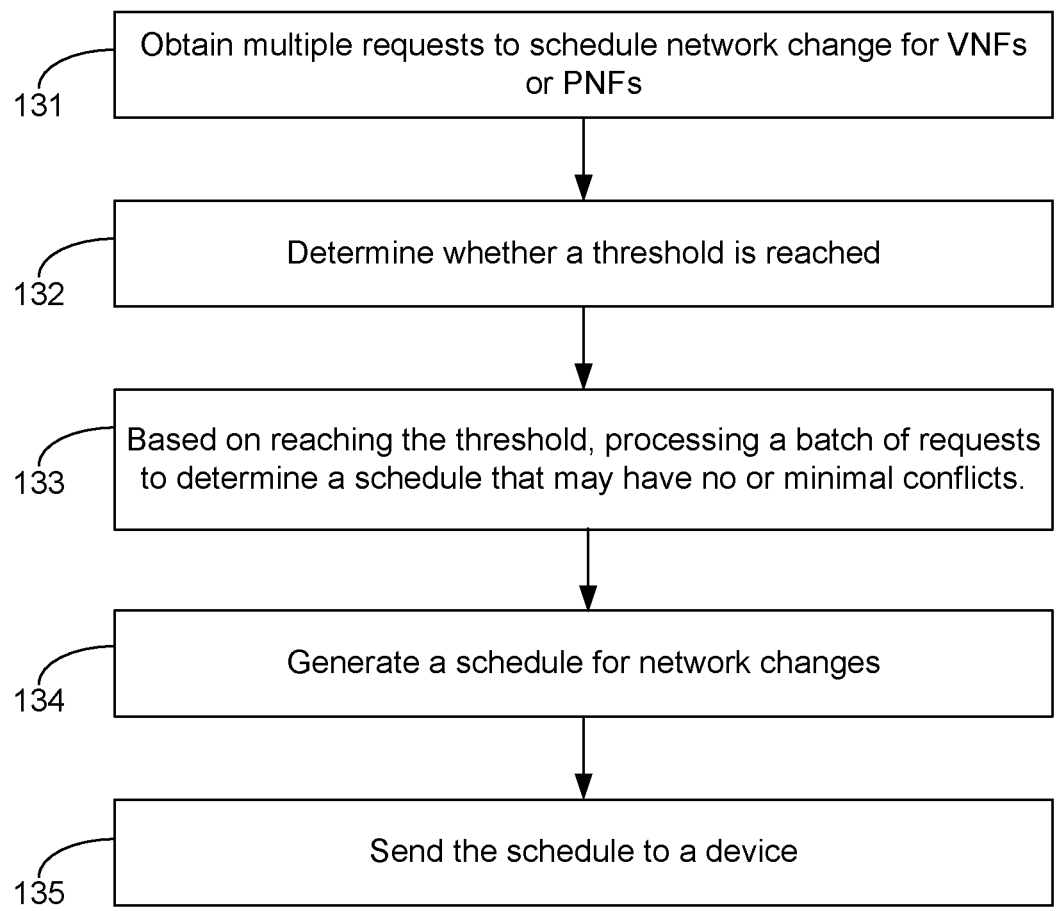
FIG. 3 illustrates an exemplary method for network change deployment for software or hardware associated with batch scheduling.

FIG. 3 illustrates an exemplary method for network change deployment for software or hardware associated with batch scheduling. As disclosed herein, the scheduling may not be a first-come first-served process for scheduling, but may be a best available based on one or more factors (e.g., information). At step 131, network device 101 (e.g., a server) may obtain multiple requests to schedule network change for virtual network functions (VNFs) or physical network functions (PNFs), among other things. The requests of step 131 may include information, such as start date of network change, end date of network change, estimated time for of network change execution, policies for conflict avoidance, list of base stations, or list of VNF instances to be scheduled, among other things. Policies for conflict avoidance may include preference for a specific time of day (e.g., maintenance window), vertical topology conflict, or capacity constraint (e.g., concurrent executions), among other things (e.g., information of step 111).

At step 132, network device 101 may determine whether a threshold is reached. The threshold may be based on time (e.g., date, day, hours), number of requests received (or not received), or type of requests received, bandwidth usage, processor usage, or number of devices in sleep mode, among other things, which may be related to the constraints disclosed herein. In a first example, the threshold may be 10 requests for a change on the date of March $2^{nd}$. In a second example, the threshold may be 10 requests received on the date of March $1^{st}$ (regardless of the date of the actual scheduled change). In a third example, the threshold may be the number of requests received within an hour for a scheduled change on March $2^{nd}$ (e.g., 1000 request for a change to the network between 1 AM-2 AM on March $2^{nd}$). Here, at step 132, a batch of requests may be gathered.

At step 133, based on reaching the threshold of step 132, processing the batch of requests (e.g., batch mode) to determine a schedule that may have no or minimal conflicts. For example, similar to what is referred to at step 113 of FIG. 2, based on the obtained information, network device 101 may determine whether requested time frames of step 131 are available, whether there are additional time frames within the same week, month, or year that would not conflict, if there is a conflict that can be resolved based on authorization without change of the schedule, or if there is a conflict that can be resolved based on a slight change of the schedule, among other things. In an example, may process all the requests to schedule a network change for March $2^{nd}$. Then based on the processing, network device 101 determines the times that each request may occur on March $2^{nd}$, which may or may not be during the requested hour (but on the same day, if practical).

At step 134, a schedule may be generated for network changes. At step 135, the generated schedule may be sent via an alert message. This message of step 135 may be sent to displays of mobile devices or other devices (e.g., see step 114 examples). The process of step 114 of FIG. 2 may be applicable herein. The methods of FIG. 2 and FIG. 3 may be combined.

The disclosed approach may provide a way for finding a schedule that is conflict free to start and policy-enabled optimization may be used to do so. Heterogeneous constraints across multiple services and layers (e.g., LTE/5G wireless cellular networks, Cloud networks (domain 2.0), or SD-WAN) may be considered. For example, not just associated with one service type (e.g., cloud networks), but the effect on multiple service types (e.g., LTE and SD-WAN) may be considered in scheduling. Further, as disclosed herein, an optimization approach may be tunable to output a conflict-free schedule or minimize the number of conflicts and tradeoff with the completion time, or the like. With reference to this optimization approach, there may be a conflict tolerance that is considered when determining a network change schedule. Conflict tolerance from an operational input perspective may be significant in allowing the operations teams to let the optimization engine provide a schedule that has minimum number of conflicts (tolerance) at the benefit of completion of the change activity within a tighter time-window. The operations team may resolve the conflicts with the other teams through other manual forms of communication or allow the conflicts to persist with an understanding of an increased level of complete outages or intermittent interrupted service than preferred. The disclosed subject matter may account for the underlying network or service changes and automatically reschedule based on apriori specified policies.

Rescheduling can occur due to: 1) cancellation of existing schedules (e.g., unavailability of loaders or network freezes); 2) higher priority request that preempts existing scheduled network changes; or 3) errors or degrading conditions on elements. The network device 101 may continuously look for opportunities for rescheduling, which may include detecting changes in network state or scheduled change state, or validate schedules are conflict-free. Each change activity has an assigned duration where it can be rescheduled. For example, certain minor changes may be rescheduled up to 24 hours prior to their scheduled start time whereas more complex changes that require more preparation may only be rescheduled more than a week before their scheduled start time. A minor change may be based on a percentage of the devices that perform an operation affected by the change (e.g., less than 10%) or the ability of the change to affect interconnectivity of devices throughout a network (e.g., a failure of a VPN configuration may only affect 10% of customer sites). The devices may be physical (e.g., gateway router or base station) or virtual (e.g., virtual machine).

The network change deployment scheduling disclosed herein is more than comparing a list of six things with deadline and a need to schedule them on a server with a limited capacity. Addressed in more detail herein is an issue with many more dimensions and is not considered by conventional approaches. The network change may be scheduled across multiple groups, where each group may have their own set of constraints and the scheduling may be done holistically. For example, there may be multiple groups that work on eNodeBs and at most one of them may work at a given eNodeB at any time so they can NOT devise their schedules independently. Moreover, an eNodeB's schedule may depend on MME's schedule which may be under the control of a different group. Each group may have different deadlines and priorities, such as a first operation group may have a patch that needs to be applied right away. Meanwhile, local transportation authority may schedule road repair that may damage some connectivity and affect what other elements can be taken out of service for an upgrade. The disclosed subject matter may consider multiple service types and organizations with heterogeneous and often conflicting requirements and come up with a schedule that works for multiple groups.

The disclosed approach is scalable and significantly reduces the potential for errors. To our knowledge, no one has addressed this problem in its full complexity. Instead of first proposing tentative schedules and then "de-conflicting" them, Change Management Schedule Optimizer (CMSO) computes a schedule that considers constraints and avoids conflicts from the start.

The network change deployment scheduling may avoid 'vertical conflicts' (e.g., do not schedule a VNF change at the same time as a change activity on the underlying physical server or the underlay in the AIC Zone), satisfies temporal policy constraints (e.g., changes scheduled during the maintenance window), capacity constraints (e.g., up to 5 change activities simultaneously), horizontal conflicts (e.g., do not schedule a VNF change at the same time as a change activity on the neighboring VNF), or service layer conflicts (e.g., do not schedule eNodeB change activity with an upstream MME activity). The schedule may also be computed aiming to minimize its duration (the makespan) or the average finishing time for each change (average completion time), and maximize the resource utilization. Moreover, if it is not reasonable to deploy a conflict-free schedule, there is a way to provide an alternative with at least conflicts as possible.

The disclosed subject matter allows multiple constraints to be considered across both PNFs and VNFs, which may minimize negative impact to services of a service provider, particularly when there are many thousands or millions of physical or virtual functions. The disclosed subject matter makes it possible to handle tens of thousands of nodes in a single schedule request. The subject matter could be considered model-driven and enable dynamic composition across several constraints (also referred to as policies in some instances herein). Constraints as disclosed herein may include order constraints, concurrency constraints, among others. The disclosed subject matter allows for rescheduling that could be triggered due to network state modifications (e.g., VNF or PNF failures or congestion) or planned change state modifications (e.g., cancellations due to executor availability). As disclosed herein, the schedule may be displayed on a mobile or other device display. It is also contemplated that the schedule may be an electronic calendar.

Figure 4:
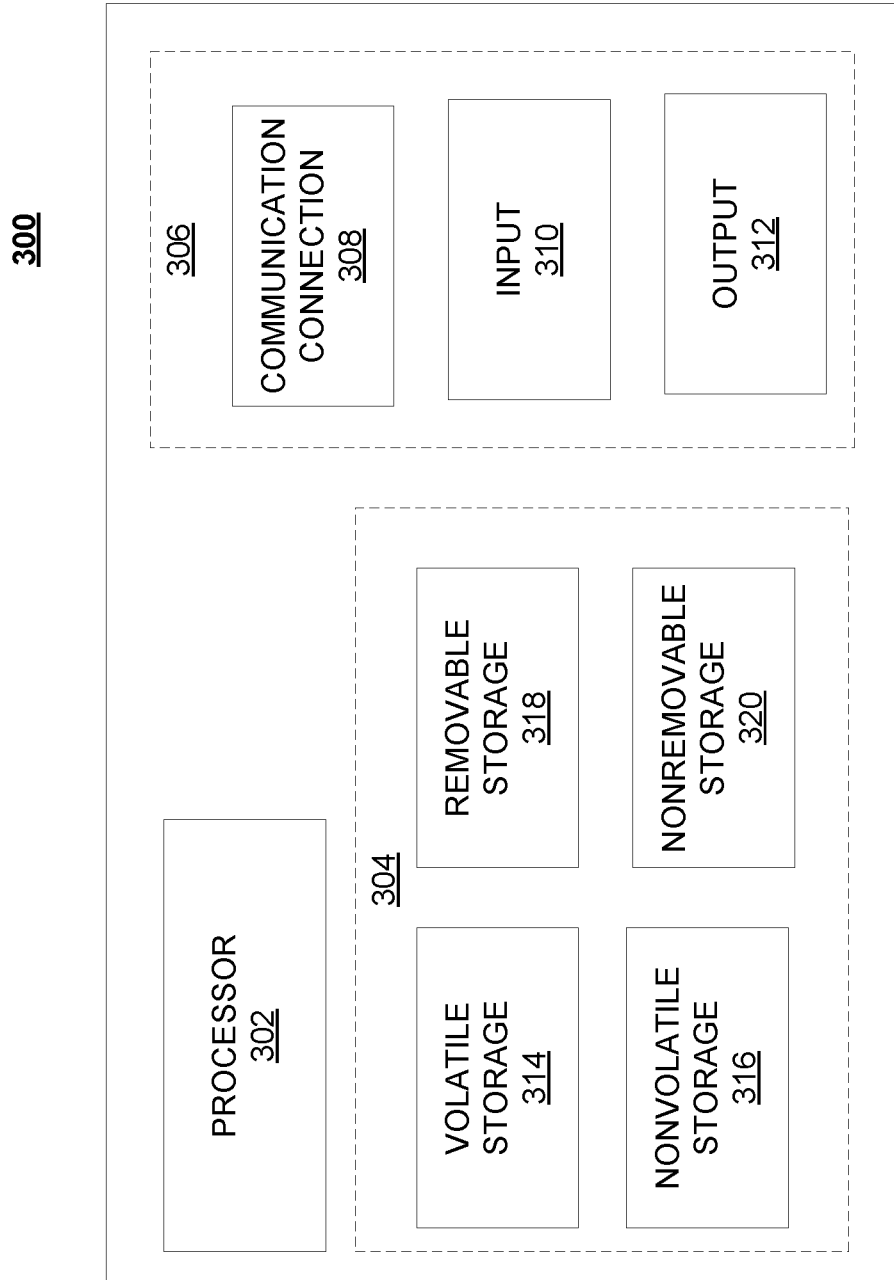
FIG. 4 illustrates a schematic of an exemplary network device.

FIG. 4 is a block diagram of network device 300 that may be connected to or comprise a component of system 100 for network change management. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 4) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
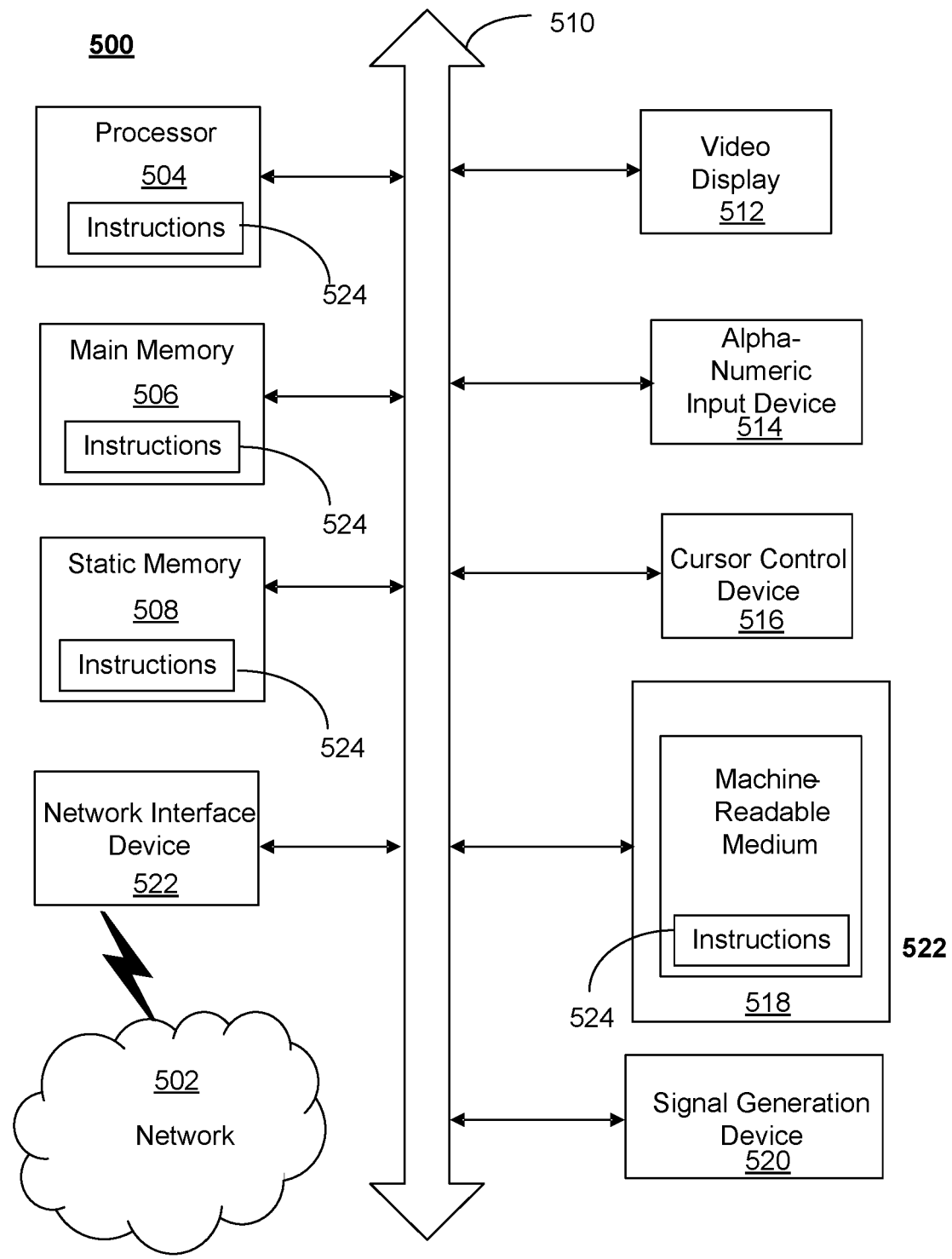
FIG. 5 illustrates an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, network device 101—network device 104, mobile device 124, and other devices of FIG. 1 for network change management. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6A:
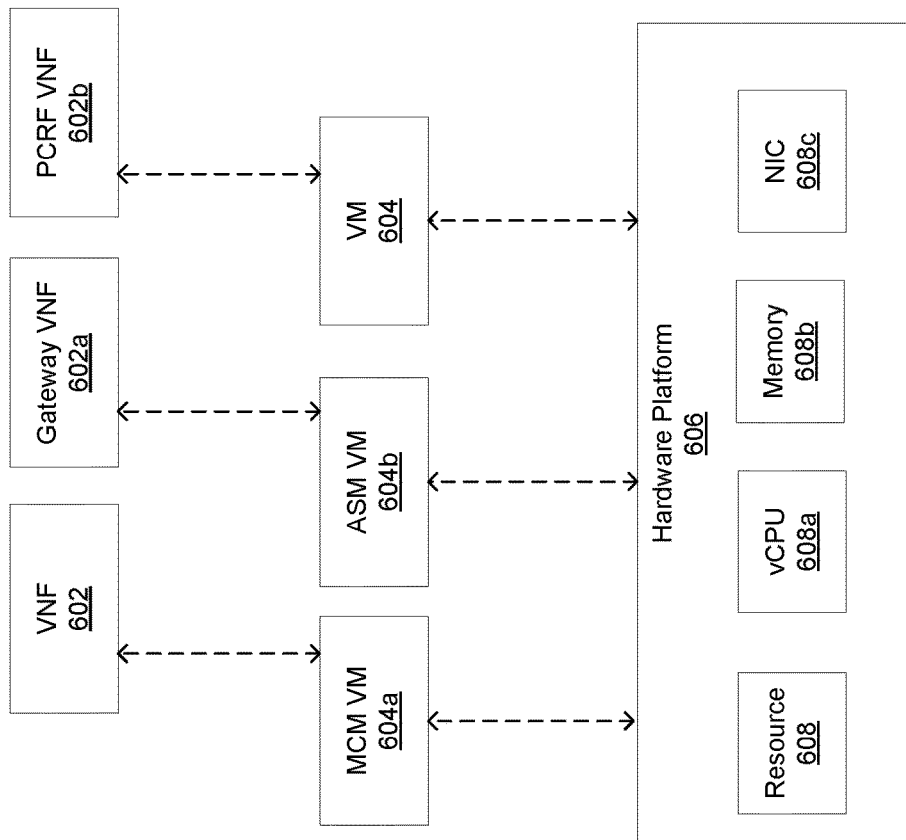
FIG. 6a is a representation of an exemplary network.

FIG. 6a is a representation of an exemplary network 600 for network change management. Network 600 (e.g., system 100) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 6a illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 6a illustrates a management control module (MCM) VM 604a, an advanced services module (ASM) VM 604b, and a DEP VM 604c. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 6B:
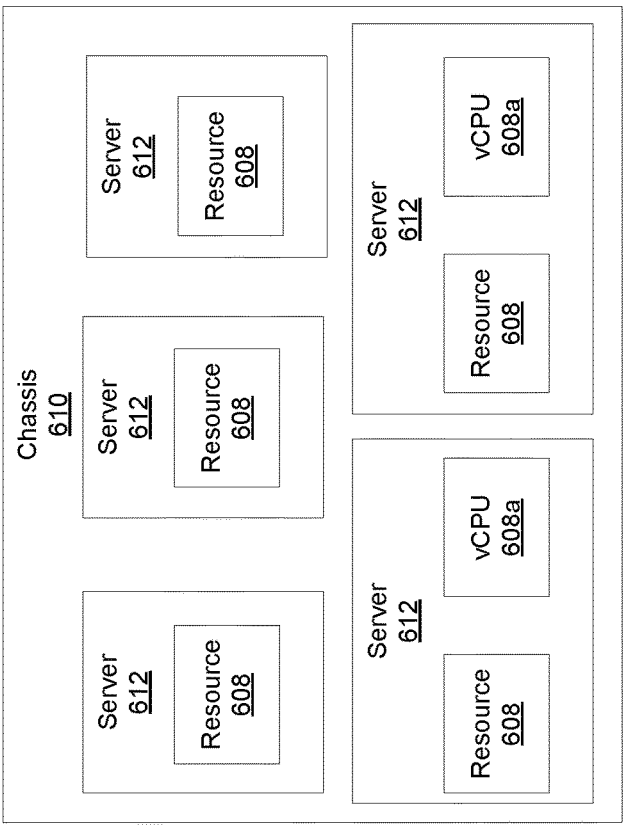
FIG. 6b is a representation of an exemplary hardware platform for a network.
Figure 6B:
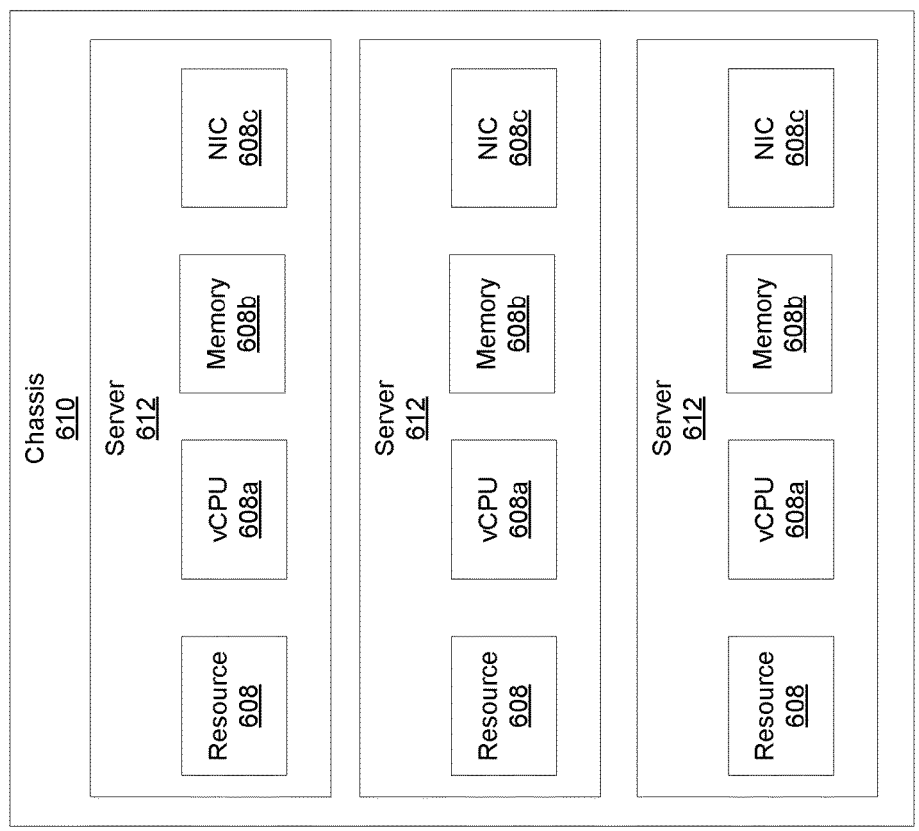

While FIG. 6a illustrates resources 608 as collectively contained in hardware platform 606, the configuration of hardware platform 606 may isolate, for example, certain memory 608c from other memory 608c. FIG. 6b provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 6b illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which network change management message can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—network change management—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

A physical or virtual machine may effectuate operations that may include obtaining a request for a network change for a virtual network function in a network. The request may include a possible date range for the network change (e.g., start date for the network change and an end date for the network change) or estimated time for the network change execution. In addition, the operations may further include obtaining information associated with a network change of a plurality of network devices; based on the request for the network change for the virtual network function and the information associated with the network change of the plurality of network devices in the network, determining a schedule for implementing the network change of the virtual network function that does not conflict with the network change of the plurality of network devices; and sending a message to a device, wherein the message comprises the schedule for implementing the network change of the virtual network function. Once a range is determined for the network change the apparatus may automatically determine that disclosed server may find a schedule within that data range for each of the changes, particularly considering constraints (e.g., Table 1). The request may include a constraint based on a threshold survivability of an operation of the network function in a region. A region may be defined by a number of devices that serve the same location. For example, a first network device and a second network device may server the same three cities and other cities that are different. The same three cities may be considered the region.

What is claimed:

1. A device, comprising:
   a processing system including a processor; and
   a memory that stores executable instructions that, when executed by the processing system, facilitate performance of operations, the operations comprising:
   receiving a first group of requests to schedule first network changes for first network functions in a network;
   determining a number of the first group of requests is above a threshold resulting in satisfying the threshold;
   in response to satisfying the threshold, generating a schedule for the first network changes;
   transmitting the schedule to a network device;
   receiving a second group of requests to schedule second network changes for second network functions in the network; and
   adjusting the first network changes resulting in first adjusted network changes in response to determining that the second network changes impact the first network changes, wherein the generating the schedule for the first network changes comprises generating the schedule for the first adjusted network changes.

2. The device of claim 1, wherein the operations comprise determining a first number of conflicts based on the first network changes, wherein the generating of the schedule for the first network changes comprises generating the schedule for the first network changes in response to determining that the first number of conflicts being less than a first conflict threshold.

3. The device of claim 2, wherein the operations comprise determining a second number of conflicts based on the first network changes, wherein the generating of the schedule for the first network changes comprises generating the schedule for the first network changes in response to determining that the second number of conflicts being greater than a second conflict threshold and the second number of conflicts less than a third conflict threshold.

4. The device of claim 3, wherein the generating of the schedule for the first network changes comprises generating the schedule for the first network changes in response to determining that a first time period to resolve the second number of conflicts is greater than a first time period threshold.

5. The device of claim 4, wherein the operations comprise determining a third number of conflicts based on the first adjusted network changes, wherein the generating of the schedule for the first network changes comprises generating the schedule for the first adjusted network changes in response to determining that the third number of conflicts being less than a fourth conflict threshold.

6. The device of claim 5, wherein the operations comprise determining a fourth number of conflicts based on the first adjusted network changes, wherein the generating of the schedule for the first network changes comprises generating the schedule for the first adjusted network changes in response to determining that the fourth number of conflicts being greater than a fifth conflict threshold and the fourth number of conflicts less than a sixth conflict threshold.

7. The device of claim 6, wherein the generating of the schedule for the first network changes comprises generating the schedule for the first adjusted network changes in response to determining that a second time period to resolve the fourth number of conflicts is greater than a second time period threshold.

8. A non-transitory, computer readable storage medium storing computer executable instructions that when executed by a computing device cause the computing device to effectuate operations comprising:
   receiving a first group of requests to schedule first network changes for first network functions in a network;
   determining a number of the first group of requests is above a threshold resulting in satisfying the threshold resulting in a first determination;
   determining a first number of conflicts based on the first network changes resulting in a second determination;
   generating a schedule for the first network changes based on the first determination and the second determination in response to determining that the first number of conflicts being greater than a first conflict threshold and the first number of conflicts less than a second conflict threshold;
   transmitting the schedule to a network device;
   receiving a second group of requests to schedule second network changes for second network functions in the network; and
   adjusting the first network changes resulting in first adjusted network changes in response to determining that the second network changes impact the first network changes, wherein the generating the schedule for the first network changes comprises generating the schedule for the first adjusted network changes.

9. The non-transitory, computer readable storage medium of claim 8, wherein the generating of the schedule for the first network changes comprises generating the schedule for the first network changes in response to determining that a first time period to resolve a second number of conflicts is greater than a first time period threshold.

10. The non-transitory, computer readable storage medium of claim 8, wherein the operations comprise determining a second number of conflicts based on the first adjusted network changes, wherein the generating of the schedule for the first network changes comprises generating the schedule for the first adjusted network changes in response to determining that the second number of conflicts being less than a third conflict threshold.

11. The non-transitory, computer readable storage medium of claim 10, wherein the operations comprise determining a third number of conflicts based on the first adjusted network changes, wherein the generating of the schedule for the first network changes comprises generating the schedule for the first adjusted network changes in response to determining that the third number of conflicts being greater than a fourth conflict threshold and the third number of conflicts less than a fifth conflict threshold.

12. The non-transitory, computer readable storage medium of claim 11, wherein the generating of the schedule for the first network changes comprises generating the schedule for the first adjusted network changes in response to determining that a time period to resolve the third number of conflicts is greater than a time period threshold.

13. A method, comprising:
receiving, by a processing system including a processor, a first group of requests to schedule first network changes for first network functions in a network;
receiving, by the processing system, a second group of requests to schedule second network changes for second network functions in the network;
determining, by the processing system, that the second network changes impact the first network changes;
adjusting, by the processing system and in response to the determining that the second network changes impact the first network changes, the first network changes resulting in first adjusted network changes;
determining, by the processing system, a number of the first group of requests is above a threshold resulting in satisfying the threshold;
in response to satisfying the threshold, generating, by the processing system, a schedule for the first network changes including generating the schedule for the first adjusted network changes; and
transmitting, by the processing system, the schedule to a network device.

14. The method of claim 13, comprising determining, by the processing system, a first number of conflicts based on the first adjusted network changes, wherein the generating of the schedule for the first adjusted network changes comprises generating, by the processing system, the schedule for the first adjusted network changes in response to determining, by the processing system, that the first number of conflicts being less than a first conflict threshold.

15. The method of claim 14, comprising determining, by the processing system, a second number of conflicts based on the first adjusted network changes.

16. The method of claim 15, wherein the generating of the schedule for the first adjusted network changes comprises generating, by the processing system, the schedule for the first adjusted network changes in response to determining, by the processing system, that the second number of conflicts being greater than a second conflict threshold and the second number of conflicts less than a third conflict threshold.

17. The method of claim 16, comprising determining, by the processing system, a first time period to resolve the second number of conflicts is greater than a first time period threshold resulting in a determination.

18. The method of claim 17, wherein the generating, by the processing system, of the schedule for the first adjusted network changes comprises generating, by the processing system, the schedule for the first adjusted network changes based on the determination.

19. The method of claim 13, wherein the first network changes include software changes and hardware changes.

20. The method of claim 13, wherein the schedule includes a batch schedule, and wherein the first network changes apply to virtual network functions and physical network functions.

* * * * *